(12) United States Patent
Arakawa

(10) Patent No.: US 6,528,811 B1
(45) Date of Patent: Mar. 4, 2003

(54) METHOD AND APPARATUS FOR RECORDING AND READING OUT RADIATION IMAGES

(75) Inventor: Satoshi Arakawa, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 7 days.

(21) Appl. No.: 09/645,439

(22) Filed: Aug. 25, 2000

(30) Foreign Application Priority Data

Aug. 25, 1999 (JP) ............................................ 11-237910

(51) Int. Cl.⁷ .............................................. G03B 42/02
(52) U.S. Cl. ....................................................... 250/586
(58) Field of Search .......................................... 250/586

(56) References Cited

U.S. PATENT DOCUMENTS

| 4,543,479 A | 9/1985 | Kato |
| 4,851,679 A | 7/1989 | Tamura et al. |
| 4,883,961 A | 11/1989 | Arakawa et al. |
| 5,276,313 A * | 1/1994 | Nakazawa et al. ........... 250/582 |

FOREIGN PATENT DOCUMENTS

| EP | 0183063 A2 * | 6/1986 | ............ G01T/1/29 |
| JP | 58-200269 | 11/1983 | ............ G03G/15/22 |
| JP | 63-189855 | 8/1988 | ............ G03B/42/02 |
| JP | 3-238441 | 10/1991 | ............ G03B/42/02 |
| JP | 8-87084 | 4/1996 | ............ G03B/42/02 |

OTHER PUBLICATIONS

Japanese Patent Abstract 03–238441 Oct. 24, 1991.

Japanese Patent Abstract 08–087084 Apr. 2, 1996.

* cited by examiner

Primary Examiner—Constantine Hannaher
(74) Attorney, Agent, or Firm—Sughrue Mion, PLLC

(57) ABSTRACT

A waiting time between when a radiation image of an object was stored on a stimulable phosphor sheet and when readout of the radiation image from the stimulable phosphor sheet is begun is set in accordance with an intensity of radiation after-glow, which continues to occur with the stimulable phosphor sheet after the radiation image was stored on the stimulable phosphor sheet. The step of reading out the radiation image and a step of moving the stimulable phosphor sheet with respect to an image read-out section is controlled such that the readout of the radiation image from the stimulable phosphor sheet is begun after the waiting time, which has been set, has elapsed. Adverse effects of the radiation after-glow are thus reduced with a simple constitution.

8 Claims, 6 Drawing Sheets

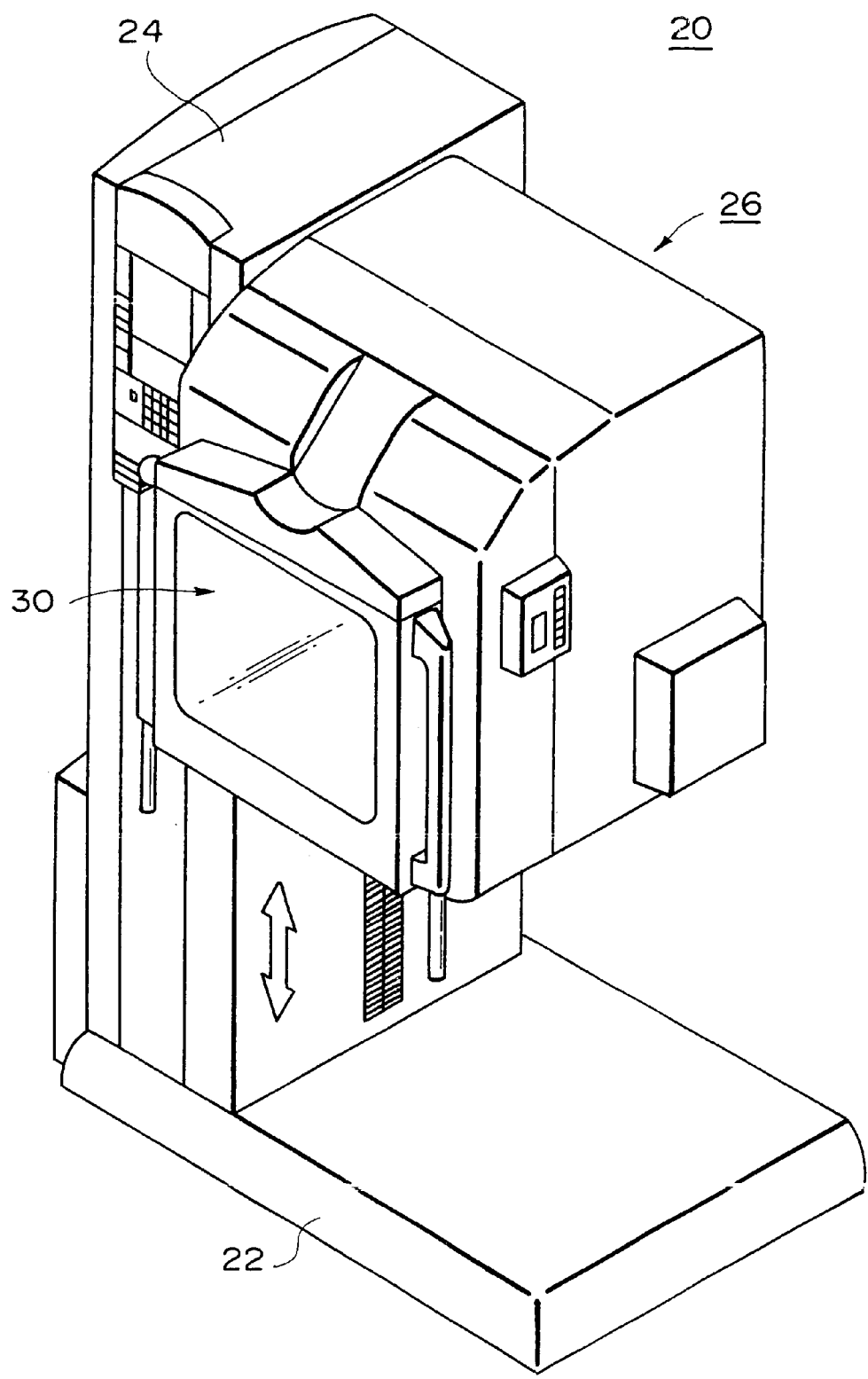
F I G. 1

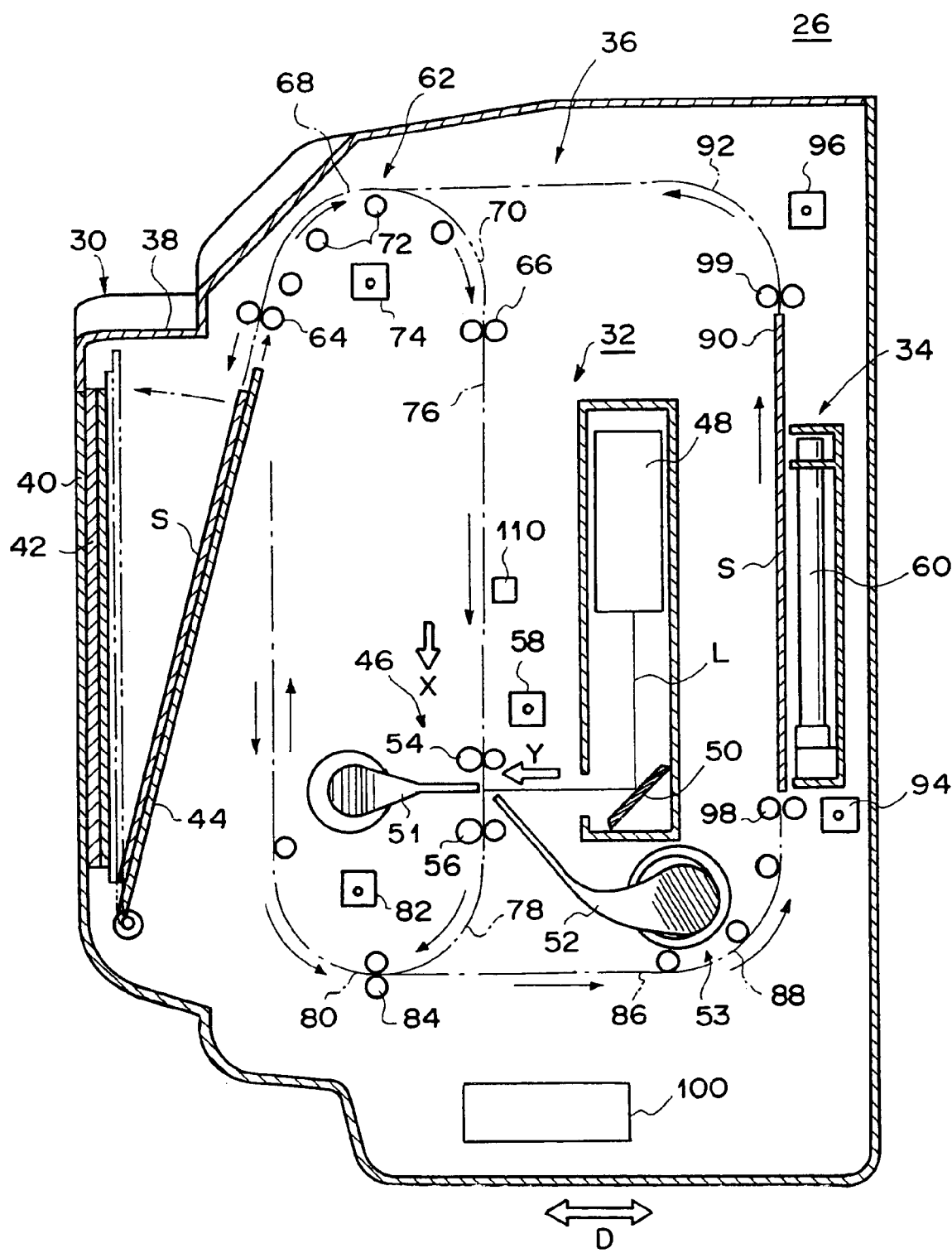
F I G. 4

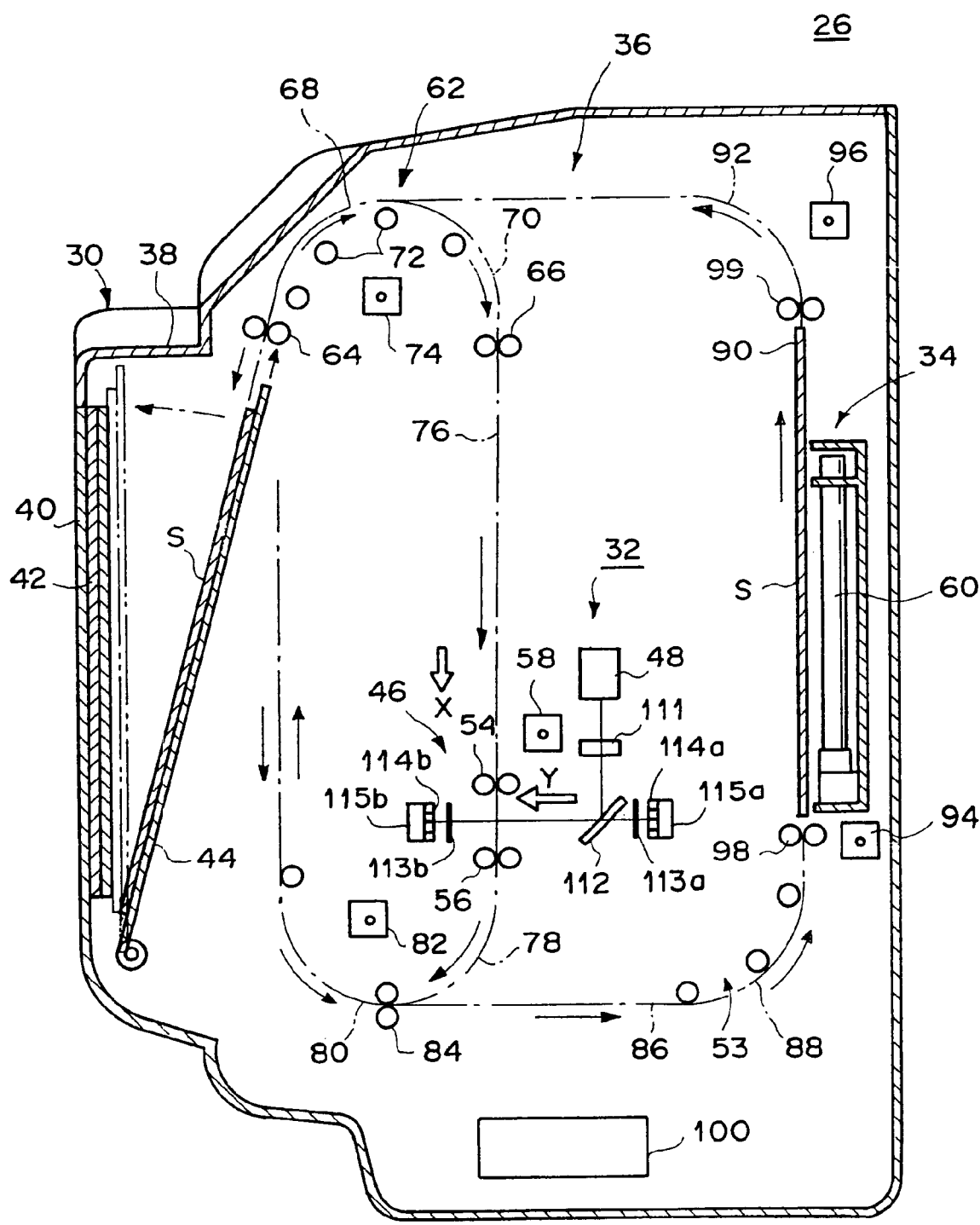
F I G . 5

METHOD AND APPARATUS FOR RECORDING AND READING OUT RADIATION IMAGES

BACKGROUND OF THE INVENTION

1. Field of the Invention

This invention relates to a radiation image recording and read-out method and apparatus, wherein a radiation image is stored on a stimulable phosphor sheet, the stimulable phosphor sheet, on which the radiation image has been stored, is exposed to stimulating rays, which cause the stimulable phosphor sheet to emit light in proportion to the amount of energy stored thereon during its exposure to radiation, the emitted light is detected, and the radiation image is thereby read out from the stimulable phosphor sheet.

2. Description of the Related Art

It has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause the stimulable phosphor sheet to emit light in proportion to the amount of energy stored thereon during its exposure to the radiation. The light emitted by the stimulable phosphor sheet, upon stimulation thereof, is photoelectrically detected with read-out means, such as a photomultiplier, and converted into an electric image signal. The image signal is then processed and used for the reproduction of the radiation image of the object as a visible image on a recording material.

The applicant proposed built-in types of radiation image recording and read-out apparatuses, comprising: (i) circulation and conveyance means for conveying at least one stimulable phosphor sheet along a circulation path, (ii) an image recording section, which is located in the circulation path and in which a radiation image of an object is stored on the stimulable phosphor sheet, (iii) an image read-out section, which is located in the circulation path and in which the radiation image is read out from the stimulable phosphor sheet, and (iv) an erasing section, which is located in the circulation path and in which energy remaining on the stimulable phosphor sheet after the radiation image has been read out therefrom is released. The built-in types of radiation image recording and read-out apparatuses are disclosed in, for example, U.S. Pat. Nos. 4,543,479 and 4,851,679, and Japanese Unexamined Patent Publication No. 3(1991)-238441. With the proposed built-in types of radiation image recording and read-out apparatuses, the stimulable phosphor sheet is utilized repeatedly and is processed efficiently.

Also, as a different example of the built-in type of radiation image recording and read-out apparatus, there has heretofore been known a radiation image recording and read-out apparatus, wherein a stimulable phosphor sheet is kept stationary, and a read-out unit, which comprises a stimulating ray source and photoelectric read-out means, is reciprocally moved with respect to the stimulable phosphor sheet. In this manner, image readout is performed. Further, a radiation image recording and read-out apparatus has been known, wherein a read-out unit is combined with an erasing section to constitute a read-out and erasing unit, and the read-out and erasing unit is reciprocally moved with respect to a stimulable phosphor sheet. Also, a radiation image read-out operation is performed in the course of forward movement of the read-out and erasing unit, and an erasing operation for releasing energy remaining on the stimulable phosphor sheet is performed in the course of backward movement of the read-out and erasing unit. Such radiation image recording and read-out apparatuses are proposed in, for example, Japanese Unexamined Patent Publication Nos. 58(1983)-200269 and 63(1988)-189855.

When a stimulable phosphor sheet, on which a radiation image has been stored, is exposed to stimulating rays, the stimulable phosphor sheet is caused by the stimulating rays to emit light in proportion to the amount of energy stored thereon during its exposure to radiation. When a stimulable phosphor sheet is exposed to radiation carrying image information of an object, instantaneous light emission occurs with the stimulable phosphor sheet simultaneously with its exposure to the radiation. The instantaneous light emission continues for a certain length of time after the exposure of the stimulable phosphor sheet to the radiation is ceased, while the intensity of the instantaneously emitted light is decreasing little by little. The instantaneous light emission is referred to as the "radiation after-glow." If the radiation image read-out operation is performed to obtain an image signal representing the radiation image in the state in which the radiation after-glow remains, noise due to the radiation after-glow will occur on the image signal. Therefore, contrast of a visible image reproduced from the image signal will become low, and a radiation image, which has good image quality and can serve as an effective tool in, particularly, the efficient and accurate diagnosis of an illness, cannot be obtained.

In order for the aforesaid problems to be eliminated, a radiation image read-out apparatus has been proposed, wherein the characteristics such that the radiation after-glow reduces sharply with heat are utilized, and wherein a radiation image read-out operation is performed after a stimulable phosphor sheet, on which a radiation image has been stored, is exposed to heat. The radiation image read-out apparatus is disclosed in, for example, Japanese Unexamined Patent Publication No. 8(1996)-87084.

However, with the radiation image read-out apparatus proposed in Japanese Unexamined Patent Publication No. 8(1996)-87084, it is necessary for the apparatus to be provided with heating means for heating the stimulable phosphor sheet. Also, it is necessary for means for cooling the regions around the heating means, or the like, to be provided such that other means in the radiation image read-out apparatus may not be adversely affected by heat. Therefore, the proposed radiation image read-out apparatus cannot be kept small in size.

SUMMARY OF THE INVENTION

The primary object of the present invention is to provide a radiation image recording and read-out method, wherein adverse effects of radiation after-glow are capable of being reduced with a simple constitution.

Another object of the present invention is to provide an apparatus for carrying out the radiation image recording and read-out method.

The present invention provides a radiation image recording and read-out method, comprising the steps of:
  i) exposing a stimulable phosphor sheet, which is capable of storing a radiation image thereon, to radiation carrying image information of an object in order to store a radiation image of the object on the stimulable phosphor sheet, ii) exposing the stimulable phosphor sheet, on which the radiation image has been stored, to stimulating rays, which cause the stimulable phosphor sheet to emit light in proportion to the amount of energy stored thereon during its exposure to the radiation, and photoelectrically detecting the emitted light with photoelectric read-out means in order to read out the radiation image, iii) releasing energy, which remains on the stimulable phosphor sheet after the radiation image has been read out therefrom, before a next radiation image is stored on the stimulable phosphor sheet, and iv) moving the stimulable phosphor sheet with respect to at least an image read-out section, in which the step of reading out the radiation image is performed, wherein the improvement comprises the steps of:

a) setting a waiting time between when the radiation image was stored on the stimulable phosphor sheet and when the readout of the radiation image from the stimulable phosphor sheet is begun, the waiting time being set in accordance with an intensity of radiation afterglow, which continues to occur with the stimulable phosphor sheet after the radiation image was stored on the stimulable phosphor sheet, and b) controlling the step of reading out the radiation image and the step of moving the stimulable phosphor sheet with respect to the image read-out section, such that the readout of the radiation image from the stimulable phosphor sheet is begun after the waiting time, which has been set, has elapsed.

In the radiation image recording and read-out method in accordance with the present invention, the intensity of the radiation after-glow may be found by directly detecting the radiation after-glow occurring with the stimulable phosphor sheet. Alternatively, the intensity of the radiation after-glow may be calculated in accordance with radiation after-glow characteristics of the stimulable phosphor sheet, a radiation dose delivered at the time of the recording of the radiation image, a tube voltage of a radiation source, information representing the time of image recording, and the like.

As will be understood from the specification, it should be noted that the term "moving a stimulable phosphor sheet with respect to an image read-out section" as used herein means movement of the stimulable phosphor sheet relative to the image read-out section, and embraces both the cases wherein the stimulable phosphor sheet is moved while the image read-out section is kept stationary, and cases wherein the image read-out section is moved while the stimulable phosphor sheet is kept stationary.

Also, the radiation image recording and readout method in accordance with the present invention may be modified such that the step of moving the stimulable phosphor sheet with respect to at least the image read-out section is a step of conveying the stimulable phosphor sheet along a predetermined circulation path, which passes through the step of storing the radiation image of the object on the stimulable phosphor sheet, the step of reading out the radiation image, and the step of releasing energy remaining on the stimulable phosphor sheet.

Further, the radiation image recording and read-out method in accordance with the present invention may be modified such that the step of reading out the radiation image is performed within a read-out unit, and the step of moving the stimulable phosphor sheet with respect to at least the image read-out section is a step of reciprocally moving the read-out unit with respect to the stimulable phosphor sheet.

Further, the radiation image recording and read-out method in accordance with the present invention should preferably be modified such that the method further comprises the step of detecting the intensity of the radiation after-glow, which continues to occur with the stimulable phosphor sheet after the radiation image was stored on the stimulable phosphor sheet, and the waiting time is set in accordance with the intensity of the radiation after-glow, which has been detected.

In such cases, the detection of the intensity of the radiation after-glow should preferably be performed with comparatively simple detection means, such as a line sensor.

Furthermore, in the radiation image recording and read-out method in accordance with the present invention, the photoelectric read-out means should preferably also perform the detection of the intensity of the radiation after-glow.

In cases where the photoelectric read-out means also performs the detection of the intensity of the radiation after-glow, the detection should preferably be performed without the stimulating rays being irradiated to the stimulable phosphor sheet.

Also, in the radiation image recording and read-out method in accordance with the present invention, the movement of the stimulable phosphor sheet should preferably be controlled such that, when the radiation after-glow is to be detected, the stimulable phosphor sheet is moved more quickly than when the radiation image is read out from the stimulable phosphor sheet.

Further, in the radiation image recording and read-out method in accordance with the present invention, the photoelectric read-out means may be constituted of a line sensor comprising a plurality of photoelectric conversion devices arrayed in a direction approximately normal to a direction, along which the stimulable phosphor sheet is moved.

The present invention also provides an apparatus for carrying out the radiation image recording and read-out method in accordance with the present invention. Specifically, the present invention also provides a radiation image recording and read-out apparatus, comprising:

i) an image recording section for exposing a stimulable phosphor sheet, which is capable of storing a radiation image thereon, to radiation carrying image information of an object in order to store a radiation image of the object on the stimulable phosphor sheet, ii) an image read-out section provided with:

a stimulating ray source for producing stimulating rays and irradiating the stimulating rays to the stimulable phosphor sheet, on which the radiation image has been stored in the image recording section, the stimulating rays causing the stimulable phosphor sheet to emit light in proportion to the amount of energy stored thereon during its exposure to the radiation, and photoelectric read-out means for photoelectrically detecting the emitted light in order to read out the radiation image, iii) an erasing section for releasing energy, which remains on the stimulable phosphor sheet after the radiation image has been read out therefrom, before a next radiation image is stored on the stimulable phosphor sheet, and iv) conveyance means for moving the stimulable phosphor sheet with respect to at least the image readout section, wherein the improvement comprises the provision of:

a) setting means for setting a waiting time between when the radiation image was stored on the stimulable phosphor sheet and when the readout of the radiation image from the stimulable phosphor sheet is begun, the waiting time being set in accordance with an intensity of radiation afterglow, which continues to occur with the stimulable phosphor sheet after the radiation image was stored on the stimulable phosphor sheet, and b) control means for controlling the image read-out section and the conveyance means, such that the readout of the radiation image from the stimulable phosphor sheet in the image read-out section is begun after the waiting time, which has been set by the setting means, has elapsed.

In the radiation image recording and read-out apparatus in accordance with the present invention, the conveyance means may be means for conveying the stimulable phosphor sheet along a predetermined circulation path, which passes through the image recording section, the image read-out section, and the erasing section.

Also, the radiation image recording and readout apparatus in accordance with the present invention may be modified such that the image read-out section is unitized to constitute a read-out unit, and the conveyance means is means for reciprocally moving the read-out unit with respect to the stimulable phosphor sheet.

Further, the radiation image recording and read-out apparatus in accordance with the present invention should preferably be modified such that the apparatus further comprises detection means for detecting the intensity of the radiation after-glow, which continues to occur with the stimulable phosphor sheet after the radiation image was stored on the stimulable phosphor sheet, and the setting means sets the waiting time in accordance with the intensity of the radiation after-glow, which has been detected by the detection means.

In such cases, as the detection means, comparatively simple detection means, such as a line sensor, should preferably be employed.

Furthermore, in the radiation image recording and read-out apparatus in accordance with the present invention, the photoelectric read-out means should preferably also act as the detection means.

In cases where the photoelectric read-out means also acts as the detection means, the detection should preferably be performed without the stimulating rays being irradiated to the stimulable phosphor sheet.

Also, in the radiation image recording and read-out apparatus in accordance with the present invention, the control means should preferably control the conveyance means such that, when the radiation after-glow is to be detected, the stimulable phosphor sheet is conveyed more quickly than when the radiation image is read out from the stimulable phosphor sheet.

Further, in the radiation image recording and read-out apparatus in accordance with the present invention, the photoelectric read-out means may be constituted of a line sensor comprising a plurality of photoelectric conversion devices arrayed in a direction approximately normal to a direction, along which the stimulable phosphor sheet is conveyed.

With the radiation image recording and read-out method and apparatus in accordance with the present invention, the waiting time between when the radiation image was stored on the stimulable phosphor sheet and when the readout of the radiation image from the stimulable phosphor sheet is begun is set in accordance with the intensity of the radiation after-glow, which continues to occur with the stimulable phosphor sheet after the radiation image was stored on the stimulable phosphor sheet. Also, when the waiting time, which has been set, has elapsed after the image recording operation was finished, the readout of the radiation image from the stimulable phosphor sheet is begun. Therefore, large-scaled means, such as heating means, need not be provided, and the readout of the radiation image from the stimulable phosphor sheet can be performed without being adversely affected by the radiation after-glow. Accordingly, an image signal free from noise due to the radiation afterglow can be obtained.

With the radiation image recording and read-out method and apparatus in accordance with the present invention, wherein the detection means for detecting the intensity of the radiation after-glow is provided, the intensity of the radiation after-glow, which continues to occur with the stimulable phosphor sheet after the radiation image was stored on the stimulable phosphor sheet, can be detected accurately. Therefore, the waiting time can be set accurately, and the operation for reading out the radiation image can be performed efficiently.

With the radiation image recording and read-out method and apparatus in accordance with the present invention, wherein the photoelectric read-out means also acts as the detection means, the detection of the intensity of the radiation after-glow can be performed without particular means being utilized. Therefore, the radiation image recording and read-out apparatus can be kept small in size.

With the radiation image recording and read-out method and apparatus in accordance with the present invention, the conveyance of the stimulable phosphor sheet may be controlled such that, when the radiation after-glow is to be detected, the stimulable phosphor sheet is conveyed more quickly than when the radiation image is read out from the stimulable phosphor sheet. In such cases, the detection of the intensity of the radiation after-glow can be performed quickly, and therefore the operation for reading out the radiation image can be performed efficiently.

With the radiation image recording and read-out method and apparatus in accordance with the present invention, wherein the photoelectric read-out means is constituted of the line sensor comprising a plurality of photoelectric conversion devices, the size of the image read-out section and the size of the radiation image recording and read-out apparatus can be kept small.

BRIEF DESCRIPTION OF THE DRAWINGS

FIG. 1 is a perspective view showing a first embodiment of the radiation image recording and read-out apparatus in accordance with the present invention, FIG. 4 is a sectional view showing a different embodiment of the radiation image recording and read-out apparatus in accordance with the present invention, FIG. 5 is a sectional view showing a second embodiment of the radiation image recording and read-out apparatus in accordance with the present invention.

DESCRIPTION OF THE PREFERRED EMBODIMENTS

The present invention will hereinbelow be described in further detail with reference to the accompanying drawings.

Figure 2:
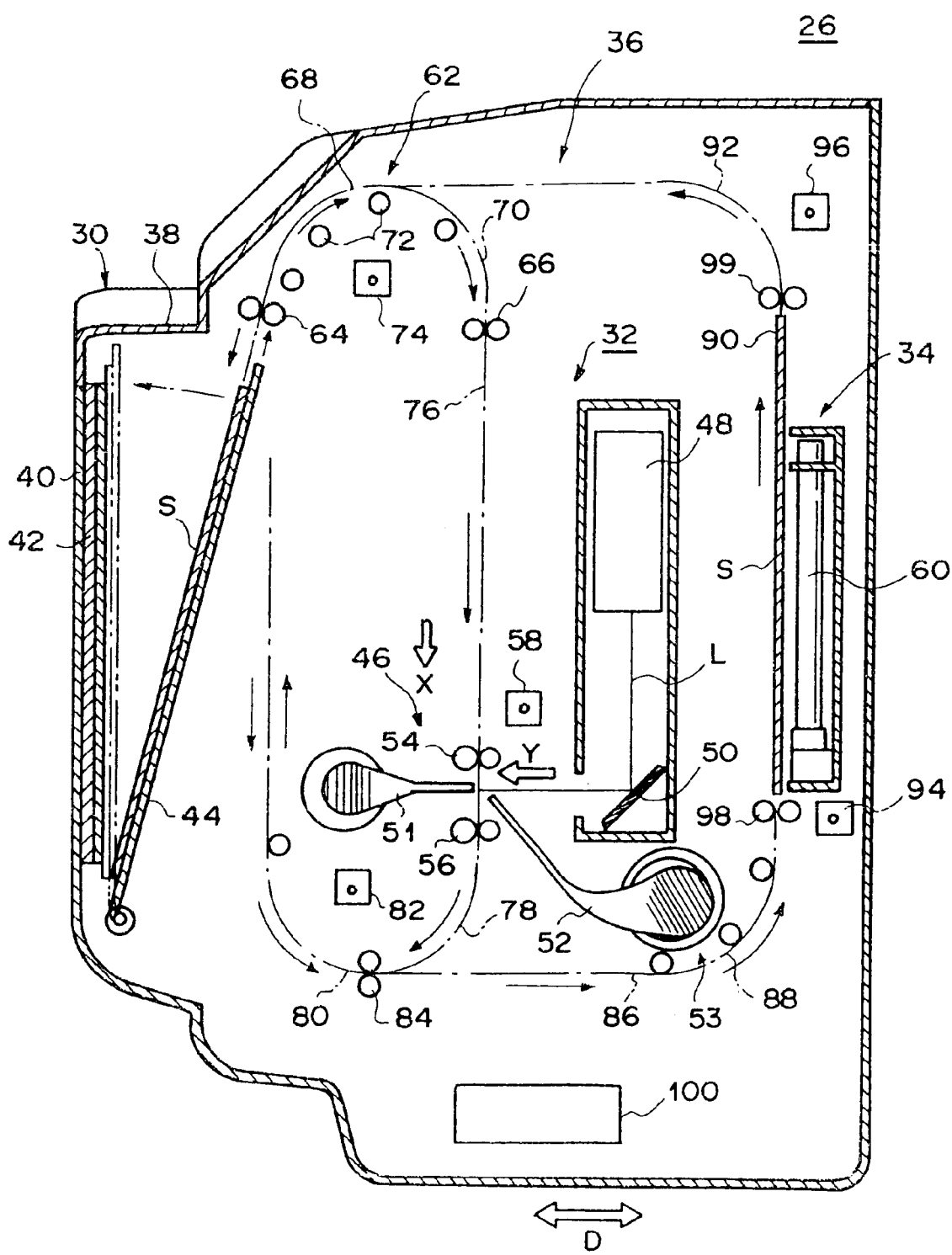
FIG. 2 is a sectional view showing the first embodiment of FIG. 1.

FIG. 1 is a perspective view showing a first embodiment of the radiation image recording and read-out apparatus in accordance with the present invention. FIG. 2 is a sectional view showing the first embodiment of FIG. 1.

A radiation image recording and read-out apparatus 20, which is a first embodiment of the radiation image recording and read-out apparatus in accordance with the present invention, comprises a base 22 and a vertical movement support section 24, which projects upwardly from the base 22. An apparatus body 26 is supported by the vertical movement support section 24 via an actuator (not shown), such as a ball screw or a cylinder, such that the apparatus body 26 can move vertically. In the apparatus body 26 of the radiation image recording and read-out apparatus 20, two stimulable phosphor sheets S, S are circulated, and an operation for recording a radiation image of an object on each of the stimulable phosphor sheets S, S and an operation for reading out a radiation image from each of the stimulable phosphor sheets S, S are performed iterately.

As illustrated in FIG. 2, the apparatus body 26 comprises an image recording section 30 for storing a radiation image of an object on the stimulable phosphor sheet S. The apparatus body 26 also comprises an image read-out section 32 for exposing the stimulable phosphor sheet S, on which the radiation image has been stored, to a laser beam L, which acts as stimulating rays, and photoelectrically reading out the radiation image. The apparatus body 26 further comprises an erasing section 34 for releasing energy remaining on the stimulable phosphor sheet S after the radiation image has been read out therefrom. The apparatus body 26 still further comprises a circulation and conveyance system 36 for circulating and conveying the two stimulable phosphor sheets S, S along a predetermined circulation path, which passes through the image recording section 30, the image read-out section 32, and the erasing section 34. Each of the stimulable phosphor sheets S, S comprises a transparent substrate and a stimulable phosphor layer overlaid on the transparent substrate. When the laser beam L is irradiated to the stimulable phosphor layer side surface of the stimulable phosphor sheet S, light is simultaneously emitted from the stimulable phosphor layer side surface and the opposite surface of the stimulable phosphor sheet S.

The image recording section 30 is provided with an image recording cover 38, which is fitted to the front surface side of the apparatus body 26. At the image recording cover 38, a phototimer 40 and a grid 42 are located in this order from the side facing the object. A support plate 44, which is capable of swinging and which supports the stimulable phosphor sheet S at the position for image recording, is located on the side of the grid 42. Also, radiation is produced by a radiation source (not shown) and irradiated to the object. The radiation carrying image information of the object impinges upon the stimulable phosphor sheet S, which is supported at the position for image recording in the image recording section 30. In this manner, a radiation image of the object is stored on the stimulable phosphor sheet S.

The image read-out section 32 is located approximately in parallel with the image recording section 30. The image read-out section 32 comprises sub-scanning conveyance means 46 for conveying the stimulable phosphor sheet S downwardly in the sub-scanning direction indicated by the arrow X. The image read-out section 32 also comprises a stimulating ray source 48 for producing a laser beam L acting as stimulating rays and scanning the stimulable phosphor sheet S, which is being conveyed in the sub-scanning direction, with the laser beam L approximately horizontally in the main scanning direction.

The stimulating ray source 48 radiates out the laser beam L downwardly. The laser beam L having been radiated out downwardly is then reflected by an optical system 50 approximately to the horizontal direction indicated by the arrow Y and is irradiated to the stimulable phosphor sheet S. The laser beam L causes the stimulable phosphor sheet S to emit light in proportion to the amount of energy stored thereon during its exposure to the radiation. A first light guide member 51 and a second light guide member 52 are located at positions in the vicinity of the area of the stimulable phosphor sheet S, which area is exposed to the laser beam L. The first light guide member 51 and the second light guide member 52 guide the light, which is emitted from the opposite surfaces of the stimulable phosphor sheet S when the stimulable phosphor sheet S is exposed to the laser beam L. The first light guide member 51 and the second light guide member 52 are connected to photomultipliers (not shown), and thereby constitute light guide means 53. In FIG. 2, an optical system for forming an image of the laser beam L on the stimulable phosphor sheet S is not shown.

The sub-scanning conveyance means 46 is provided with a first roller pair 54 and a second roller pair 56, which are located at a predetermined spacing from each other along the vertical direction indicated by the arrow X. The first roller pair 54 and the second roller pair 56 are rotated periodically by a motor 58 via transmission means (not shown), such as belts and pulley means. As will be described later, the sub-scanning conveyance means 46 is controlled by control means 100.

The erasing section 34 is located in parallel with the image recording section 30 and the image read-out section 32. The erasing section 34 comprises a plurality of erasing light sources 60, 60, . . . , each of which extends vertically. Alternatively, each of the erasing light sources 60, 60, . . . may extends horizontally.

The circulation and conveyance system 36 is provided with turning conveyance means 62, which is located between the image recording section 30 and the image read-out section 32. The turning conveyance means 62 conveys the stimulable phosphor sheet S from the image recording section 30 to the image read-out section 32 by turning the stimulable phosphor sheet S by an angle of 180°. The turning conveyance means 62 comprises a roller pair 64 located in the vicinity of a sheet inlet/outlet of the image recording section 30, and a roller pair 66 located above the image read-out section 32. The turning conveyance means 62 also comprises curved guide plates 68 and 70 having a curved shape, which are located between the roller pair 64 and the roller pair 66. The turning conveyance means 62 further comprises a plurality of guide rollers 72, 72, . . . , which are located under the curved guide plates 68 and 70. Each of the curved guide plates 68 and 70 has a narrow width and guides the opposite side areas (hereinbelow referred to as the edge areas) of the stimulable phosphor sheet S other than the area utilized for the radiation image recording and readout. The roller pair 64 and the roller pair 66 are rotated by a motor 74.

A pair of guide plates 76, 76 are located below the roller pair 66. The guide plates 76, 76 extend toward the image read-out section 32 and guide the opposite surfaces of the edge areas of the stimulable phosphor sheet S. Also, curved guide plates 78 and 80 for guiding the edge areas of the stimulable phosphor sheet S are located on the outlet side of the image read-out section 32. The curved guide plates 78 and 80 bend the stimulable phosphor sheet S from the vertical position toward the left in FIG. 2 and then guide the stimulable phosphor sheet S upwardly. The end portion of the curved guide plate 80 extends upwardly in a straight line.

A roller pair 84, which is rotated by a motor 82, is located between the curved guide plates 78 and 80. A guide plate 86 extends horizontally from a position in the vicinity of the roller pair 84 toward the second light guide member 52. A guide plate 90 is located at and end of the guide plate 86. The guide plate 90 extends vertically via a curved guide plate 88. The guide plate 90 extends along the erasing section 34, and a curved guide plate 92 is located on the side upward from the guide plate 90. An end of the curved guide plate 92 is located so as to correspond to the position of the curved guide plate 68. A roller pair 98, which is rotated by a motor 94, is located under the guide plate 90. Also, a roller pair 99, which is rotated by a motor 96, is located above the guide plate 90.

Figure 3:
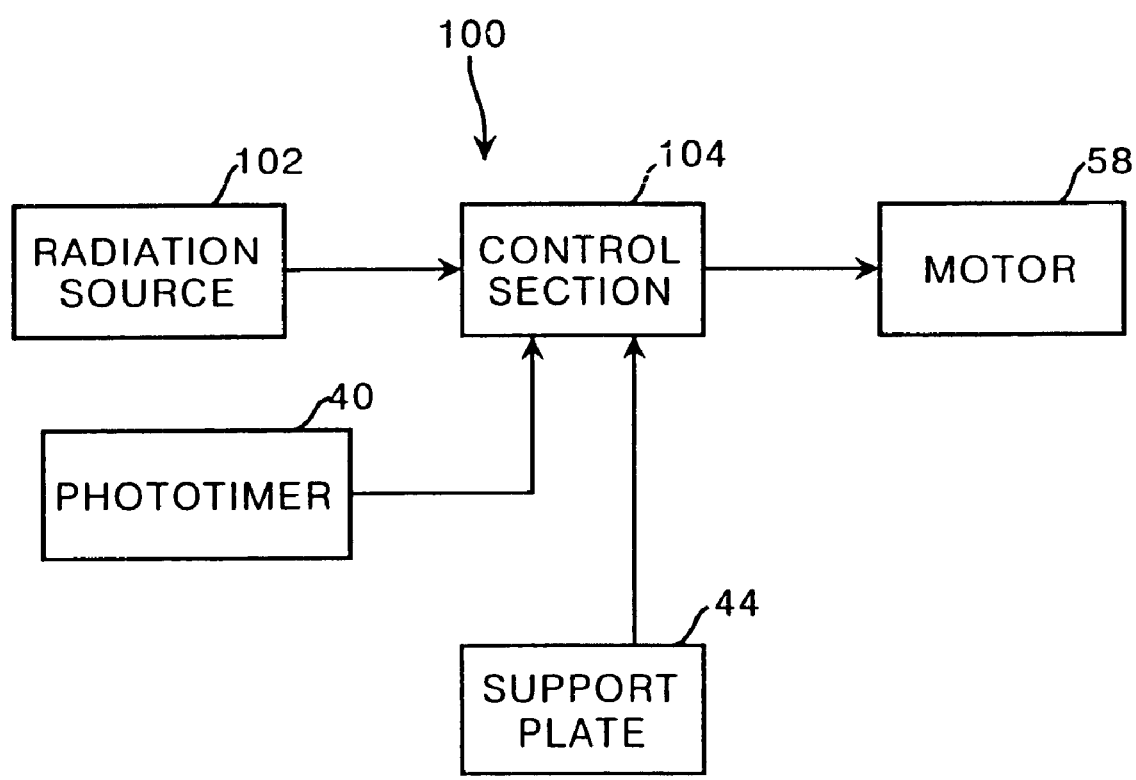
FIG. 3 is a schematic block diagram showing control means.

FIG. 3 is a schematic block diagram showing the control means 100. As illustrated in FIG. 3, the control means 100 is provided with a control section 104 for controlling the waiting time between when the recording of the radiation image on the stimulable phosphor sheet S was finished and when the readout of the radiation image from the stimulable phosphor sheet S is begun. The waiting time is controlled in accordance with the information representing a tube voltage of a radiation source 102 in the image recording section 30 and the information representing the time, at which the image recording operation was performed. The information representing the time, at which the image recording operation was performed, is obtained from the phototimer 40 in the image recording section 30. Specifically,the control section 104 forms mAs information from the information representing the tube voltage of the radiation source 102 and the information representing the time, at which the image recording operation was performed, and having been obtained from the phototimer 40. In accordance with the mAs information, the control section 104 sets the waiting time between when the recording of the radiation image on the stimulable phosphor sheet S was finished and when the readout of the radiation image from the stimulable phosphor sheet S is begun. Also, the control section 104 controls the motor 58, which rotates the first roller pair 54 of the sub-scanning conveyance means 46, such that the waiting time having been set may be ensured. In this manner, the timing, with which the readout of the radiation image is begun, is controlled. For example, in cases where the tube voltage of the radiation source 102 is 80 kV, and the mAs information having been formed from the information representing the tube voltage and the information representing the time, at which the image recording operation was performed, and having been obtained from the phototimer 40 is 200 mAs, the waiting time is set at a value of at least 10 seconds. In cases where the mAs information having been formed is 100 mAs, the waiting time is set at a value of at least 4 seconds. Also, in cases where 24 the mAs information having been formed is 50 mAs, the waiting time is set at a value of at least 2 seconds. In this manner, the control section 104 sets the waiting time before the intensity of the radiation after-glow, which continues to occur with the stimulable phosphor sheet S after the radiation image was stored on the stimulable phosphor sheet S, becomes equal to approximately zero. In such cases, the waiting time is set by considering the radiation after-glow characteristics of the stimulable phosphor sheet S. Also, the motor 58 is controlled such that the waiting time may be ensured.

Specifically, the swinging of the support plate 44 in the image recording section 30 is detected, and the finish of the image recording operation performed on the stimulable phosphor sheet S is thereby detected. At the time at which the image recording operation is finished, the measurement of the waiting time having been set in the manner described above is begun. In cases where the time occurring between when the support plate 44 was swung and when the leading end of the stimulable phosphor sheet S arrives at the first roller pair 54 is 2 seconds, and the waiting time having been set is at least 10 seconds, the rotation of the first roller pair 54 waits for at least 8 seconds after the leading end of the stimulable phosphor sheet S arrives at the first roller pair 54. Thereafter, the motor 58 is operated, and the operation for reading out the radiation image from the stimulable phosphor sheet S is begun. Also, in cases where the waiting time having been set is at least 4 seconds, the motor 58 waits for at least 2 seconds after the leading end of the stimulable phosphor sheet S arrives at the first roller pair 54, and the operation for reading out the radiation image from the stimulable phosphor sheet S is then begun. In cases where the waiting time having been set is 2 seconds, instead of the stimulable phosphor sheet S waiting at the position of the first roller pair 54, the stimulable phosphor sheet S arriving at the first roller pair 54 is immediately conveyed into the image read-out section 32, and the operation for reading out the radiation image from the stimulable phosphor sheet S is begun.

How the radiation image recording and read-out apparatus 20 operates will be described hereinbelow.

As illustrated in FIG. 2, the apparatus body 26 accommodates two stimulable phosphor sheets S, S. When one of the stimulable phosphor sheets S, S is located in the image recording section 30, the other stimulable phosphor sheet S waits in the erasing section 34. In the image recording section 30, the support plate 44 is swung toward the object (not shown), and the stimulable phosphor sheet S is supported at the position for image recording by the support plate 44. In this state, the radiation image of the object is recorded on the stimulable phosphor sheet S.

After the radiation image of the object has been recorded on the stimulable phosphor sheet S, the stimulable phosphor sheet S is swung inwardly together with the support plate 44 and is then delivered toward the roller pair 64. At this time, the swinging of the support plate 44 is detected, and the finish of the image recording operation performed on the stimulable phosphor sheet S is thereby detected by the control section 104 of the control means 100. The roller pair 64 is rotated by the motor 74, and the stimulable phosphor sheet S is conveyed by the rotation of the roller pair 64 to the turning conveyance means 62. By the guiding action of the curved guide plates 68 and 70, and the plurality of the guide rollers 72, 72, . . . of the turning conveyance means 62, the stimulable phosphor sheet S is turned by an angle of 180° and conveyed to the roller pair 66, such that the image recording surface of the stimulable phosphor sheet S may not come into contact with any member. Thereafter, by the rotating action of the roller pair 66, the stimulable phosphor sheet S is transferred to the guide plates 76, 76, which are located vertically. The guide plates 76, 76 guide the edge areas of the stimulable phosphor sheet S and feed the stimulable phosphor sheet S to the sub-scanning conveyance means 46, which constitutes the image read-out section 32.

In the sub-scanning conveyance means 46, the first roller pair 54 and the second roller pair 56, which are located at a predetermined spacing from each other along the vertical direction indicated by the arrow X, are rotated by the motor 58. The stimulable phosphor sheet S is nipped by the first roller pair 54 and the second roller pair 56 and conveyed downwardly in the sub-scanning direction indicated by the arrow X.

Before the stimulable phosphor sheet S is thus conveyed in the sub-scanning direction by the sub-scanning conveyance means 46, the control means 100 has set the waiting time between when the recording of the radiation image on the stimulable phosphor sheet S was finished and when the readout of the radiation image from the stimulable phosphor sheet S is begun. The waiting time is set in accordance with the information representing the tube voltage of the radiation source 102 in the image recording section 30 and the information representing the time, at which the image recording operation was performed, and having been obtained from the phototimer 40. The control means 100 measures the waiting time after the support plate 44 was swung. Also, the control means 100 ceases the operation of the motor 5 and causes the stimulable phosphor sheet S to wait on the side upstream from the image read-out section 32 before the waiting time having been set elapses. After the set waiting time has elapsed, the control means 100 operates the motor 58 to rotate the first roller pair 54 and feeds the stimulable phosphor sheet S into the image read-out section 32.

After the stimulable phosphor sheet S has been fed into the image read-out section 32, the laser beam L is produced by the stimulating ray source 48. The laser beam L travels downwardly, is reflected by the optical system 50 to approximately the horizontal direction indicated by the arrow Y, and is caused to impinge upon the image recording surface. In this manner, the stimulable phosphor sheet S is scanned with the laser beam L in the main scanning direction. When the stimulable phosphor sheet S is exposed to the laser beam L, light is emitted from the image recording surface and the opposite surface of the stimulable phosphor sheet S. The emitted light is guided by the first light guide member 51 and the second light guide member 52 and photoelectrically detected by the photomultipliers (not shown).

While the operation for reading out the radiation image from the stimulable phosphor sheet S is being performed in the image read-out section 32, the leading end side of the stimulable phosphor sheet S is guided by the curved guide plates 78 and 80 and conveyed by the rotating action of the roller pair 84 from the downward direction to the upward direction. When the operation for reading out the radiation image from the stimulable phosphor sheet S is finished, the tail end side of the stimulable phosphor sheet S is fed to a position in the vicinity of the roller pair 84. In this state, the roller pair 84 is rotated reversely by the motor 82.

Therefore, the stimulable phosphor sheet S is conveyed horizontally along the guide plate 86 with the image recording surface facing down and is then conveyed upwardly via the curved guide plate 88. At this time, the motor 94 is operated to rotate the roller pair 98, and the stimulable phosphor sheet S is conveyed upwardly by the guiding action of the guide plate 90. Also, the erasing light sources 60, 60, . . . constituting the erasing section 34 are turned on, and energy remaining on the stimulable phosphor sheet S is erased. The erased stimulable phosphor sheet S waits in the erasing section 34.

When the operation for recording the radiation image on the stimulable phosphor sheet S is performed in the image recording section 30 in the manner described above, the other stimulable phosphor sheet S waits in the erasing section 34. While the stimulable phosphor sheet S, on which the radiation image has been stored, is being subjected to the image read-out operation in the image read-out section 32 in the manner described above, the other stimulable phosphor sheet S waiting in the erasing section 34 is nipped by the roller pair 99 rotated by the motor 96 and is sent to the curved guide plate 68 by being guided by the curved guide plate 92. Also, the roller pair 64 is rotated reversely to the direction in which the roller pair 64 was rotated when the image recording operation was finished. By the roller pair 64 rotating reversely, the other stimulable phosphor sheet S is sent into the image recording section 30. The position of the other stimulable phosphor sheet S is adjusted with respect to the image recording section 30 and supported by the swinging action of the support plate 44, and a next radiation image of an object (not shown) is recorded on the other stimulable phosphor sheet S.

As described above, in the first embodiment of the radiation image recording and read-out apparatus in accordance with the present invention, the waiting time between when the recording of the radiation image on the stimulable phosphor sheet S was finished and when the readout of the radiation image from the stimulable phosphor sheet S is begun is controlled in accordance with the intensity of the radiation after-glow, which continues to occur with the stimulable phosphor sheet S. Therefore, large-scaled means, such as the heating means in the radiation image read-out apparatus proposed in Japanese Unexamined Patent Publication No. 8(1996)-87084, need not be provided, and the radiation image can be read out from the stimulable phosphor sheet S without being adversely affected by the radiation after-glow. Accordingly, an image signal free from noise due to the radiation after-glow can be obtained.

In the first embodiment described above, the waiting time is set in accordance with the information representing the tube voltage of the radiation source 102 in the image recording section 30 and the information representing the time, at which the image recording operation was performed, and having been obtained from the phototimer 40. Alternatively, as illustrated in FIG. 4, a line sensor 110, which comprises a plurality of photoelectric conversion devices arrayed in a line, may be located between the image recording section 30 and the image read-out section 32. Also, the radiation after-glow, which continues to occur with the stimulable phosphor sheet S, may be detected with the line sensor 110, and the waiting time may be set in accordance with the maximum intensity of the radiation after-glow. For example, in cases where the maximum intensity of the radiation after-glow detected by the line sensor 110 is a value equivalent to 0.05 mR, the waiting time may be set at a value of at least 10 seconds. In cases where the maximum intensity of the radiation after-glow detected by the line sensor 110 is a value equivalent to 0.01 mR, the waiting time may be set at a value of at least 4 seconds. In cases where the maximum intensity of the radiation after-glow detected by the line sensor 110 is a value equivalent to 0.005 mR, the waiting time may be set at a value of zero second. In this manner, the intensity of the radiation after-glow, which continues to occur with the stimulable phosphor sheet S, can be detected accurately, and the waiting time can be determined more accurately. Therefore, the image read-out operation can be performed efficiently.

As another alternative, the radiation after-glow, which continues to occur with the stimulable phosphor sheet S, may be detected with the light guide means 53. The radiation after-glow may be detected by either one of the first light guide member 51 and the second light guide member 52. In such cases, instead of the laser beam L being irradiated to the stimulable phosphor sheet S, the first roller pair 54 and the second roller pair 56 of the sub-scanning conveyance means 46 are operated to convey the stimulable phosphor sheet S, and the radiation after-glow emitted from the stimulable phosphor sheet S is detected by the light guide means 53 while the stimulable phosphor sheet S is being thus conveyed. Also, the waiting time before the image read-out operation is begun is set in accordance with the intensity of the radiation after-glow having thus been detected. After the detection of the radiation after-glow has been finished, the first roller pair 54 and the second roller pair 56 are rotated reversely, and the stimulable phosphor sheet S is thereby conveyed toward the image recording section 30. When the leading end of the stimulable phosphor sheet S takes the position on the side upstream from the first roller pair 54, the first roller pair 54 and the second roller pair 56 are ceased, and the stimulable phosphor sheet S is caused to wait in this state. Further, in the same manner as that described above, the first roller pair 54 is ceased and the stimulable phosphor sheet S is caused to wait for the image read-out operation before the set waiting time elapses from the finish of the image recording operation, which is detected from the swinging operation of the support plate 44. After the set waiting time has elapsed, the first roller pair 54 is operated, and the operation for reading out the radiation image from the stimulable phosphor sheet S is begun. In such cases, the waiting time includes the time required to detect the radiation after-glow and the time required to reversely convey the stimulable phosphor sheet S.

In cases where the radiation after-glow, which continues to occur with the stimulable phosphor sheet S, is detected with the light guide means 53 in the manner described above, the detection of the radiation after-glow can be performed without any particular means being provided. Therefore, the radiation image recording and read-out apparatus can be kept small in size.

Also, in such cases, when the radiation after-glow is to be detected, the stimulable phosphor sheet S should preferably be conveyed more quickly than when the radiation image is read out from the stimulable phosphor sheet S. In this manner, the detection of the radiation after-glow can be performed more quickly, and the image read-out operation can be performed efficiently.

In the embodiments described above, the radiation image is read out from the opposite surfaces of the stimulable phosphor sheet S by utilizing the first light guide member 51 and the second light guide member 52. Alternatively, only either one of the two light guide members (e.g., only the second light guide member 52) may be provided, and the radiation image may be read out from only one surface of the stimulable phosphor sheet S.

Also, in the embodiments described above, the light emitted by the stimulable phosphor sheet S is photoelectrically detected by utilizing the first light guide member 51, the second light guide member 52, and the photomultipliers (not shown). Alternatively, the photoelectric detection of the emitted light may be performed by utilizing line sensors, each of which comprises a plurality of photoelectric conversion devices arrayed in a line. A second embodiment of the radiation image recording and read-out apparatus in accordance with the present invention, which is constituted in such a manner, will be described hereinbelow. FIG. 5 is a sectional view showing the second embodiment of the radiation image recording and read-out apparatus in accordance with the present invention, in which the line sensors are utilized. In FIG. 5, similar elements are numbered with the same reference numerals with respect to FIG. 2.

As illustrated in FIG. 5, in the second embodiment of the radiation image recording and read-out apparatus in accordance with the present invention, the image read-out section 32 comprises the stimulating ray source 48, and an optical system 111. The optical system 111 is constituted of a combination of a collimator lens for converging the laser beam L, which has been produced by the stimulating ray source 48, onto the stimulable phosphor sheet S and a toric lens for expanding the laser beam L in only one direction. The image read-out section 32 also comprises a dichroic mirror 112 for reflecting the laser beam L to the direction indicated by the arrow Y. The dichroic mirror 112 is set such that the dichroic mirror 112 reflects the laser beam L and transmits only the light emitted by the stimulable phosphor sheet S. The image read-out section 32 further comprises a stimulating ray cut-off filter 113a for filtering out the laser beam L, which is reflected from the laser beam irradiation side surface of the stimulable phosphor sheet S and is mixed slightly in the light having been emitted from the laser beam irradiation side surface of the stimulable phosphor sheet S and having passed through the dichroic mirror 112, and transmitting only the light emitted by the stimulable phosphor sheet S. The image read-out section 32 still further comprises a line sensor 115a comprising a plurality of arrayed photoelectric conversion devices 114a, 114a, which receive the emitted light having passed through the stimulating ray cut-off filter 113a and photoelectrically convert the emitted light. The image read-out section 32 also comprises a stimulating ray cut-off filter 113b for filtering out the laser beam L, which has passed through the stimulable phosphor sheet S and is mixed slightly in the light having been emitted from the surface of the stimulable phosphor sheet S opposite to the laser beam irradiation side surface, and transmitting only the light emitted by the stimulable phosphor sheet S. The image read-out section 32 further comprises a line sensor 115b comprising a plurality of arrayed photoelectric conversion devices 114b, 114b, . . . , which receive the emitted light having passed through the stimulating ray cut-off filter 113b and photoelectrically convert the emitted light.

With the second embodiment of the radiation image recording and read-out apparatus in accordance with the present invention, wherein the line sensors 115a and 115b are utilized in lieu of the first light guide member 51, the second light guide member 52, and the photomultipliers, the image read-out section 32 can be kept small in size, and therefore the radiation image recording and read-out apparatus can be kept small in size.

Figure 6A:
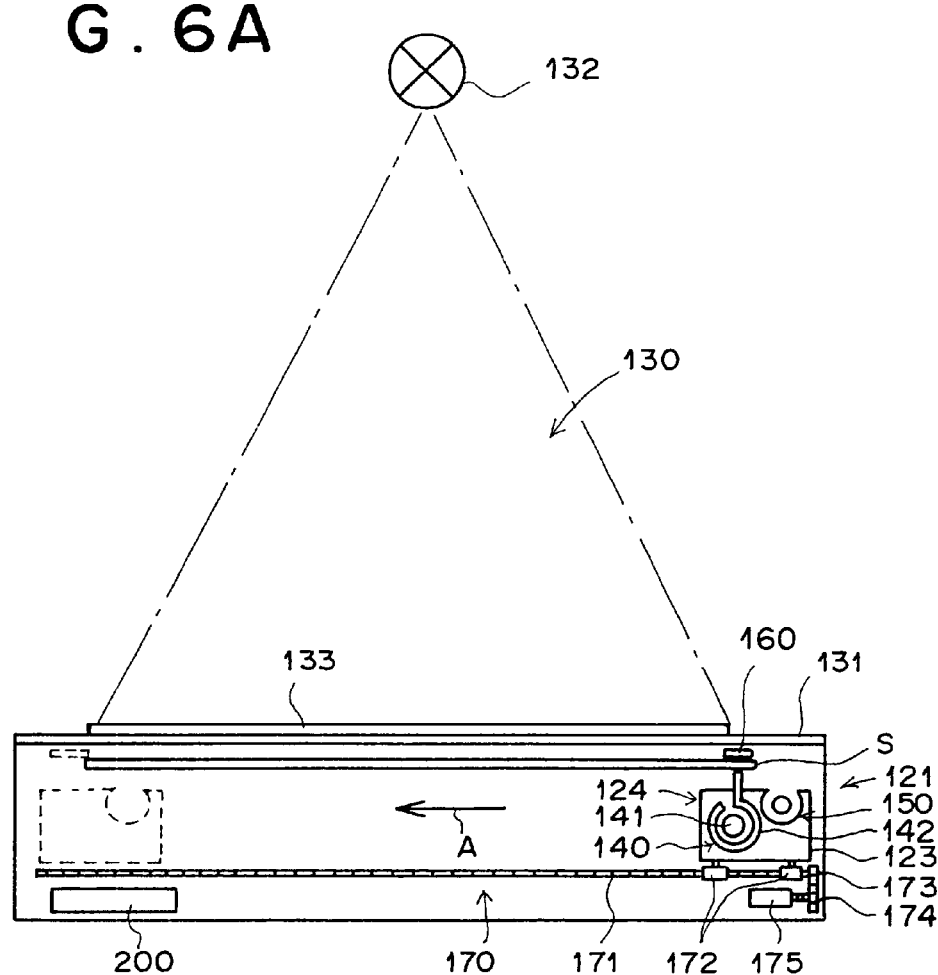
FIGS. 6A and 6B are sectional views showing a third embodiment of the radiation image recording and read-out apparatus in accordance with the present invention.
Figure 6B:
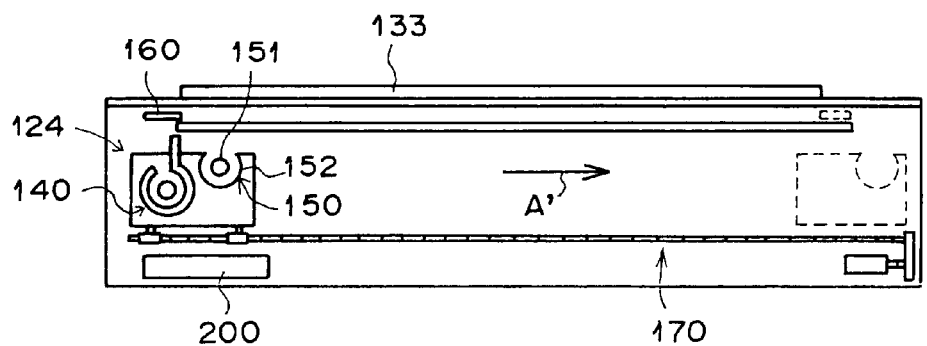

A third embodiment of the radiation image recording and read-out apparatus in accordance with the present invention will be described hereinbelow. FIGS. 6A and 6B are sectional views showing the third embodiment of the radiation image recording and read-out apparatus in accordance with the present invention. With reference to FIGS. 6A and 6B, the third embodiment of the radiation image recording and read-out apparatus in accordance with the present invention comprises an apparatus body 121, and a radiation source 132, which may be constituted of an X-ray source, or the like, and which is disposed above an image recording table 131 constituting an upper surface of the apparatus body 121.

A stimulable phosphor sheet S is secured and held by holding means (not shown) below the image recording table 131 within the apparatus body 121. The stimulable phosphor sheet S is composed of a transparent substrate and a stimulable phosphor layer overlaid on the transparent substrate. The image recording table 131 has the radiation transmitting properties. A phototimer 133 is located on the image recording table 131. In the third embodiment, an image recording section 130 is constituted by the image recording table 131, the radiation source 132, and the phototimer 133.

Stimulating ray irradiation means 140 and an erasing section 150, which are accommodated in a case housing 123, are disposed below the stimulable phosphor sheet S. A line sensor 160, which is connected to the case housing 123, is disposed above and close to the stimulable phosphor sheet S. In the third embodiment, the image read-out section is constituted by the stimulating ray irradiation means 140 and the line sensor 160. Also, a read-out and erasing unit 124 is constituted by the stimulating ray irradiation means 140 and the erasing section 150, which are accommodated in the case housing 123, and the line sensor 160, which is secured to the case housing 123.

The read-out and erasing unit 124 is capable of moving reciprocally between a right end position (first position) as indicated by the solid line in FIG. 6A and a left end position (second position) as indicated by the solid line in FIG. 6B, while the read-out and erasing unit 124 is facing the stimulable phosphor sheet S. In the third embodiment, the movement in the direction as indicated by the arrow A from the first position to the second position is referred to as the forward movement, and the movement in the direction as indicated by the arrow A' from the second position to the first position is referred to as the backward movement.

The read-out and erasing unit 124 is reciprocally moved by unit moving means 170. By way of example, the unit moving means 170 is composed of a screw rod 171 extending in the direction of movement of the read-out and erasing unit 124, unit support members 172, 172 engaged with the screw rod 171, a gear 173 secured to the screw rod 171, a gear 174 meshing with the gear 173, and a motor 175 for rotating the gear 174 in the normal and reverse directions. The screw rod 171 is rotated by the motor 175 via the gears 173 and 174, and the unit support members 172, 172 are thereby moved. In this manner, the reciprocal movement of the read-out and erasing unit 124 is performed.

The stimulating ray irradiation means 140 irradiates the stimulating rays to the stimulable phosphor sheet S linearly in a direction, which is normal to the direction of movement of the read-out and erasing unit 124. The stimulating ray irradiation means 140 is composed of an elongated fluorescent lamp 141 and a fluorescent light guide member 142, which is fabricated by forming a sheet-shaped material containing a fluorescent substance.

When light is irradiated to the surface of the fluorescent light guide member 142, the fluorescent substance contained in the fluorescent light guide member 142 is stimulated by the light to radiate fluorescence. The fluorescence advances to the end face by repeating total reflection inside of the fluorescent light guide member 142. Therefore, the stimulating rays having a high intensity are linearly radiated from the end face of the fluorescent light guide member 142 in a form such that energy of the light irradiated to the surface of the fluorescent light guide member 142 is condensed. Accordingly, the light produced by the fluorescent lamp 141 is caused to impinge upon the surface of the fluorescent light guide member 142, and the fluorescence excited by the light within the fluorescent light guide member 142 is radiated from the end face of the fluorescent light guide member 142. In this manner, the linear stimulating rays can be obtained. The fluorescent lamp 141 is disposed below the stimulable phosphor sheet S. Also, the fluorescent light guide member 142 is rounded to surround the overall circumference of the fluorescent lamp 141, and an end face of the fluorescent light guide member 142 extends close to and facing the stimulable phosphor sheet S in the direction, which is normal to the direction of movement of the read-out and erasing unit 124.

By way of example, the erasing section 150 is provided with an erasing light source 151, which may be constituted of a fluorescent lamp, or the like, extending in the main scanning direction, and a reflection plate 152 for reflecting the erasing light, which is radiated downwardly by the erasing light source 151, toward the surface of the stimulable phosphor sheet S. In cases where the erasing light source 151 is always laid bare upwardly, the erasing light source 151 may be turned on only when the erasing is to be performed and may be turned off at the time of the image read-out operation. Alternatively, a movable shutter, or the like, may be provided. When the image read-out operation is performed, the movable shutter may be located above the erasing light source 151 in order to block the erasing light only when the erasing is to be performed, the movable shutter may be retracted from the position above the erasing light source 151 and may lay bare the erasing light source 151. In such cases, the erasing light source 151 can always be turned on.

Also, in the third embodiment, as in the first and second embodiments described above, control means 200 is provided. With the control means 200, the waiting time between when the recording of the radiation image on the stimulable phosphor sheet S was finished and when the readout of the radiation image from the stimulable phosphor sheet S is begun is controlled in accordance with the information representing the tube voltage of the radiation source 132 in the image recording section 130 and the information representing the time, at which the image recording operation was performed, and having been obtained from the phototimer 133. Specifically, the control means 200 calculates the waiting time in accordance with the information representing the tube voltage of the radiation source 132 in the image recording section 130 and the information representing the time, at which the image recording operation was performed, and having been obtained from the phototimer 133. When the calculated waiting time has elapsed after the image recording operation was finished, the control means 200 operates the motor 175 of the unit moving means 170.

How the third embodiment operates will be described hereinbelow. When the object lies on the image recording table 131 in the image recording section 130, the radiation source 132 is operated, and the radiation is irradiated to the object. The radiation carrying image information of the object impinges upon the stimulable phosphor sheet S. In this manner, the radiation image of the object is stored on the stimulable phosphor sheet S. When the waiting time having been set by the control means 200 elapses from the finish of the image recording operation, the motor 175 of the unit moving means 170 is operated to move the read-out and erasing unit 124, and the operation for reading out the radiation image from the stimulable phosphor sheet S is performed.

When the radiation image is to be read out from the stimulable phosphor sheet S, the fluorescent lamp 141 is turned on. As described above, when the fluorescent substance contained in the fluorescent light guide member 142 is exposed to the light produced by the fluorescent lamp 141, the fluorescent substance produces the stimulating rays. The stimulable phosphor sheet S is linearly exposed to the stimulating rays, and light is emitted from the portion of the stimulable phosphor sheet S exposed to the stimulating rays. The emitted light is received by the line sensor 160.

Thereafter, the unit moving means 170 conveys the read-out and erasing unit 124 with respect to the stimulable phosphor sheet S by a distance corresponding to the width of one scanning line and in the direction indicated by the arrow A in FIG. 6A, and the read-out step described above is iterated. The read-out step is iterated with respect to the entire surface of the stimulable phosphor sheet S, and the radiation image having been stored on the stimulable phosphor sheet S is thereby read out.

At the time at which the image read-out operation is finished, the read-out and erasing unit 124 takes the second position indicated by the broken line in FIG. 6A. Thereafter, as illustrated in FIG. 6B, the read-out and erasing unit 124 is conveyed in the direction indicated by the arrow A' from the second position to the first position, and the entire surface of the stimulable phosphor sheet S is exposed to the erasing light produced by the erasing light source 151 in the erasing section 150 accommodated in the read-out and erasing unit 124, which is being conveyed in the direction indicated by the arrow A'. As the read-out and erasing unit 124 moves in the direction indicated by the arrow A', the erasing light produced by the erasing light source 151 is irradiated successively to the entire surface of the stimulable phosphor sheet S. In this manner, energy remaining on the stimulable phosphor sheet S is erased. The erased stimulable phosphor sheet S is capable of being used for the recording of a next radiation image in the image recording section 130. The read-out and erasing unit 124 is returned to the first position.

As described above, with the third embodiment, wherein the read-out and erasing unit 124 is utilized, the waiting time between when the recording of the radiation image on the stimulable phosphor sheet S was finished and when the readout of the radiation image from the stimulable phosphor sheet S is begun is controlled in accordance with the intensity of the radiation after-glow, which continues to occur with the stimulable phosphor sheet S. Therefore, large-scaled means, such as the heating means in the radiation image read-out apparatus proposed in Japanese Unexamined Patent Publication No. 8(1996)-87084, need not be provided, and the radiation image can be read out from the stimulable phosphor sheet S without being adversely affected by the radiation after-glow. Accordingly, an image signal free from noise due to the radiation after-glow can be obtained.

In addition, all of the contents of Japanese Patent Application Nos. 11(1999)-237910 and 2000-246655 are incorporated into this specification by reference.

What is claimed is:

1. A radiation image recording and read-out method, comprising the steps of:

i) exposing a stimulable phosphor sheet, which is capable of storing a radiation image thereon, to radiation carrying image information of an object in order to store a radiation image of the object on the stimulable phosphor sheet, ii) exposing the stimulable phosphor sheet, on which the radiation image has been stored, to stimulating rays, which cause the stimulable phosphor sheet to emit light in proportion to the amount of energy stored thereon during its exposure to the radiation, and reading out the radiation image by photoelectrically detecting the emitted light, iii) releasing energy, which remains on the stimulable phosphor sheet after the radiation image has been read out therefrom, before a next radiation image is stored on the stimulable phosphor sheet, and iv) moving the stimulable phosphor sheet with respect to at least an image read-out section, in which the step of reading out the radiation image is performed, wherein the improvement comprises the steps of:

a) setting a waiting time between when the radiation image was stored on the stimulable phosphor sheet and when the readout of the radiation image from the stimulable phosphor sheet is begun, the waiting time being set in accordance with an intensity of radiation after-glow, which continues to occur with the stimulable phosphor sheet after the radiation image was stored on the stimulable phosphor sheet, b) controlling the step of reading out the radiation image and the step of moving the stimulable phosphor sheet with respect to the image read-out section, such that the readout of the radiation image from the stimulable phosphor sheet is begun after the waiting time, which has been set, has elapsed; and c) detecting the intensity of the radiation after-glow, which continues to occur with the stimulable phosphor sheet after the radiation image was stored on the stimulable phosphor sheet, and the waiting time is set in accordance with the intensity of the radiation after-glow, which has been detected, wherein the photoelectric read-out means also performs the detection of the intensity of the radiation after-glow and wherein the movement of the stimulable phosphor sheet is controlled such that, when the radiation after-glow is to be detected, the stimulable phosphor sheet is moved more quickly than when the radiation image is read out from the stimulable phosphor sheet.

2. A method as defined in claim 1 wherein the step of moving the stimulable phosphor sheet with respect to at least the image read-out section is a step of conveying the stimulable phosphor sheet along a predetermined circulation path, which passes through the step of storing the radiation image of the object on the stimulable phosphor sheet, the step of reading out the radiation image, and the step of releasing energy remaining on the stimulable phosphor sheet.

3. A method as defined in claim 1 wherein the step of reading out the radiation image is performed within a read-out unit, and the step of moving the stimulable phosphor sheet with respect to at least the image read-out section is a step of reciprocally moving the read-out unit with respect to the stimulable phosphor sheet.

4. A method as defined in claims 1, 2, or 3 wherein the photoelectric read-out means is constituted of a line sensor comprising a plurality of photoelectric conversion devices arrayed in a direction approximately normal to a direction, along which the stimulable phosphor sheet is moved.

5. A radiation image recording and read-out apparatus, comprising:

i) an image recording section for exposing a stimulable phosphor sheet, which is capable of storing a radiation image thereon, to radiation carrying image information of an object in order to store a radiation image of the object on the stimulable phosphor sheet, ii) an image read-out section provided with:

a stimulating ray source for producing stimulating rays and irradiating the stimulating rays to the stimulable phosphor sheet, on which the radiation image has been stored in the image recording section, the stimulating rays causing the stimulable phosphor sheet to emit light in proportion to the amount of energy stored thereon during its exposure to the radiation, and photoelectric read-out means for photoelectrically detecting the emitted light in order to read out the radiation image, iii) an erasing section for releasing energy, which remains on the stimulable phosphor sheet after the radiation image has been read out therefrom, before a next radiation image is stored on the stimulable phosphor sheet, and iv) conveyance means for moving the stimulable phosphor sheet with respect to at least the image read-out section, wherein the improvement comprises the provision of a) setting means for setting a waiting time between when the radiation image was stored on the stimulable phosphor sheet and when the readout of the radiation image from the stimulable phosphor sheet is begun, the waiting time being set in accordance with an intensity of radiation after-glow, which continues to occur with the stimulable phosphor sheet after the radiation image was stored on the stimulable phosphor sheet, b) control means for controlling the image read-out section and the conveyance means, such that the readout of the radiation image from the stimulable phosphor sheet in the image read-out section is begun after the waiting time, which has been set by the setting means, has elapsed, and a detection means for detecting the intensity of the radiation after-glow, which continues to occur with the stimulable phosphor sheet after the radiation image was stored on the stimulable phosphor sheet, wherein the setting means sets the waiting time in accordance with the intensity of the radiation after-glow, which has been detected by the detection means, the photoelectric read-out means also acts as the detection means, and the control means controls the conveyance means such that, when the radiation after-glow is to be detected, the stimulable phosphor sheet is conveyed more quickly than when the radiation image is read out from the stimulable phosphor sheet.

6. An apparatus as defined in claim 5 wherein the conveyance means is means for conveying the stimulable phosphor sheet along a predetermined circulation path, which passes through the image recording section, the image read-out section, and the erasing section.

7. An apparatus as defined in claim 5 wherein the image read-out section is to constitute a read-out and erasing unit, and the conveyance means is for reciprocally moving the read-out and erasing unit with respect to the stimulable phosphor sheet.

8. An apparatus as defined in claims 5, 6, or 7 wherein the photoelectric read-out means is constituted of a line sensor comprising a plurality of photoelectric conversion devices arrayed in a direction approximately normal to a direction, along which the stimulable phosphor sheet is conveyed.

* * * * *